(12) United States Patent
Tung et al.

(10) Patent No.: US 7,663,416 B2
(45) Date of Patent: Feb. 16, 2010

(54) APPARATUS AND RELATED METHOD FOR GENERATING OUTPUT CLOCK

(75) Inventors: Hsu-Jung Tung, Kao-Hsiung (TW); Chi-Kung Kuan, Tao-Yuan Hsien (TW); Yu-Pin Chou, Miao-Li Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 11/847,343

(22) Filed: Aug. 30, 2007

(65) Prior Publication Data

US 2008/0061854 A1 Mar. 13, 2008

(30) Foreign Application Priority Data

Sep. 8, 2006 (TW) .............................. 95133207 A

(51) Int. Cl.
*H03L 7/06* (2006.01)
(52) U.S. Cl. ....................................... 327/156; 327/162
(58) Field of Classification Search .................. 327/156
See application file for complete search history.

(56) References Cited

U.S. PATENT DOCUMENTS

| 4,180,783 | A | 12/1979 | Khalifa |
| 6,215,835 | B1 | 4/2001 | Kyles |
| 7,202,752 | B2 | 4/2007 | May |
| 2004/0163022 | A1* | 8/2004 | Whetsel ...................... 714/726 |
| 2006/0055468 | A1 | 3/2006 | Hallivuori |
| 2006/0255868 | A1* | 11/2006 | May ........................... 331/57 |
| 2007/0188249 | A1* | 8/2007 | Abadeer et al. ........... 331/36 C |

FOREIGN PATENT DOCUMENTS

JP        2006-217994      * 8/2006

* cited by examiner

*Primary Examiner*—Lincoln Donovan
*Assistant Examiner*—Daniel Rojas
(74) *Attorney, Agent, or Firm*—Winston Hsu

(57) ABSTRACT

An apparatus for generating an audio output clock is disclosed. The apparatus at least includes a plurality of dividers and a frequency synthesizer. The apparatus utilizes the dividers to achieve dispersive frequency-division operations such that the anti-noise ability of the apparatus can be improved. In addition, the apparatus also utilizes dynamic phase adjustment to increase accuracy of the frequency of the audio output clock.

19 Claims, 2 Drawing Sheets

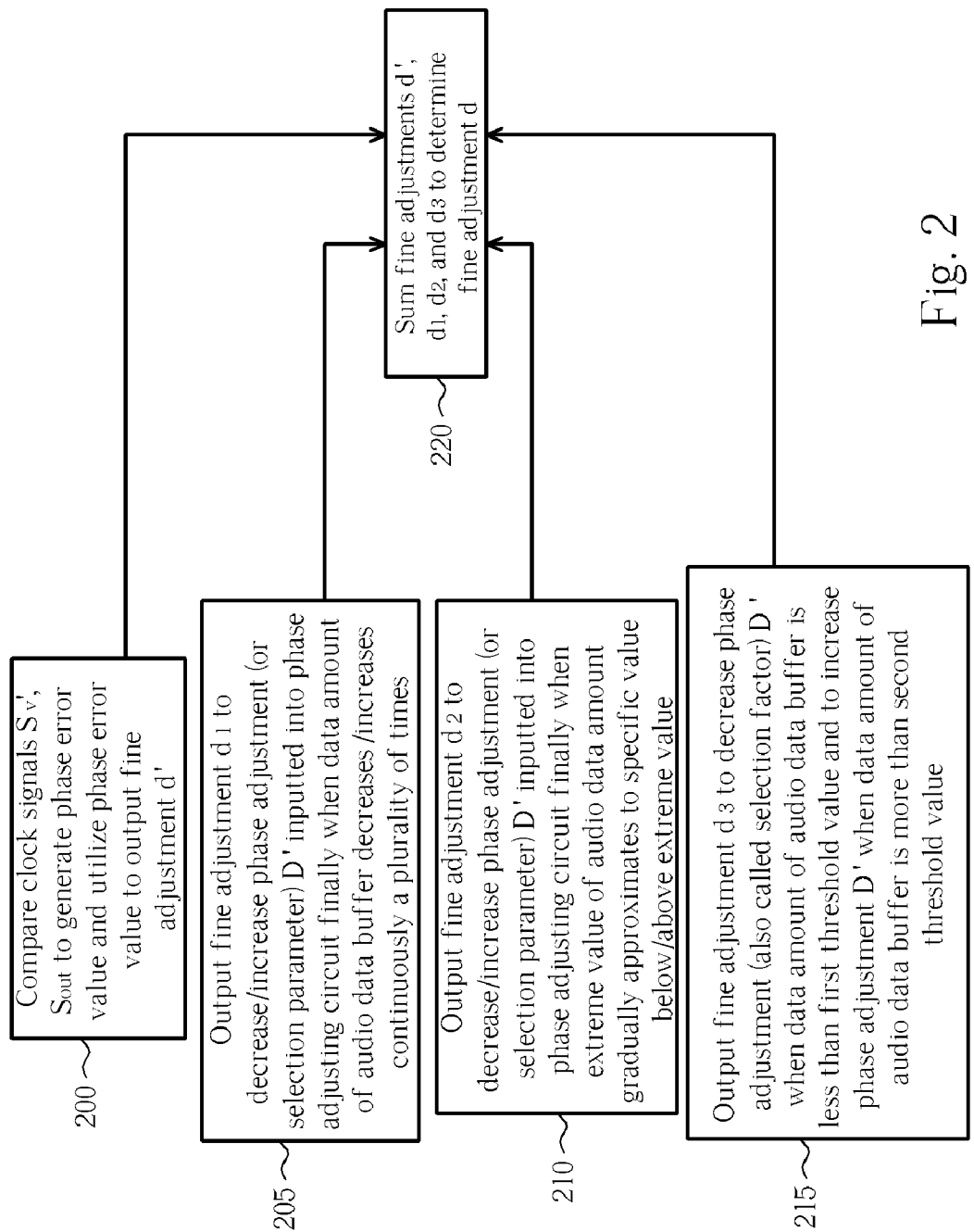

APPARATUS AND RELATED METHOD FOR GENERATING OUTPUT CLOCK

BACKGROUND OF THE INVENTION

1. Field of the Invention

The present invention relates to a clock generating scheme, and more particularly, to an apparatus and related method for generating an output clock.

2. Description of the Prior Art

As is well known by those skilled in this art, High-Definition Multimedia Interface (HDMI) is an interface for transmitting video/audio data. Data transmitted to the receiving end of the HDMI only includes data for the frequency of a video clock signal. Recovering the frequency of an audio clock signal can be obtained by the following equation:

$$N \times f_v = CTS \times 128 \times f_a,\quad \text{Equation (1)}$$

wherein $f_v$ is the frequency of the video clock signal and $f_a$ is the frequency of the audio clock signal; N and CTS are parameters included in information frames respectively. In general, a prior art scheme performs a frequency-division operation upon the frequency of the video clock signal (i.e. $f_v$) to derive a signal having a frequency $f_v/CTS$, and then performs the operation of a phase-locked loop (i.e. a frequency divider, placed on the loop path, performs a frequency-division operation with a division factor N) upon the signal having the frequency $f_v/CTS$ to derive a signal having another frequency $N*f_v/CTS$. Finally, the prior art scheme also performs another frequency-division operation upon the signal having the frequency $N*f_v/CTS$ with a division factor 128 to derive a signal having a frequency $N*f_v/(CTS*128)$. In the HDMI specification, however, parameters N and CTS are defined with 20 bits since they need to have sufficient accuracy. Moreover, to achieve much higher accuracy, the parameter N is almost equal to 11648, and the parameter CTS is a value between tens of thousands and hundreds of thousands. Therefore, in circuit design, it is very difficult for the prior art scheme to perform the above-mentioned operations. The prior art scheme also easily suffers from noise interference.

SUMMARY OF THE INVENTION

One of the objectives of the present invention is therefore to provide an apparatus and related method for generating an audio output clock with higher accuracy according to video data of a multimedia signal from the multimedia interface, to solve the above-mentioned problems.

One of the objectives of the present invention is to provide an apparatus for generating an audio output clock. The apparatus utilizes a plurality of frequency dividers to achieve dispersive frequency-division operations such that the anti-noise ability of the apparatus can be improved.

Another objective of the present invention is to provide an apparatus for generating an audio output clock. The apparatus utilizes dynamic phase adjustment to increase accuracy of the frequency of the audio output clock.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flowchart illustrating operation of the fine tuning circuit for determining fine adjustment according to an embodiment of the present invention.

DETAILED DESCRIPTION

Figure 1:
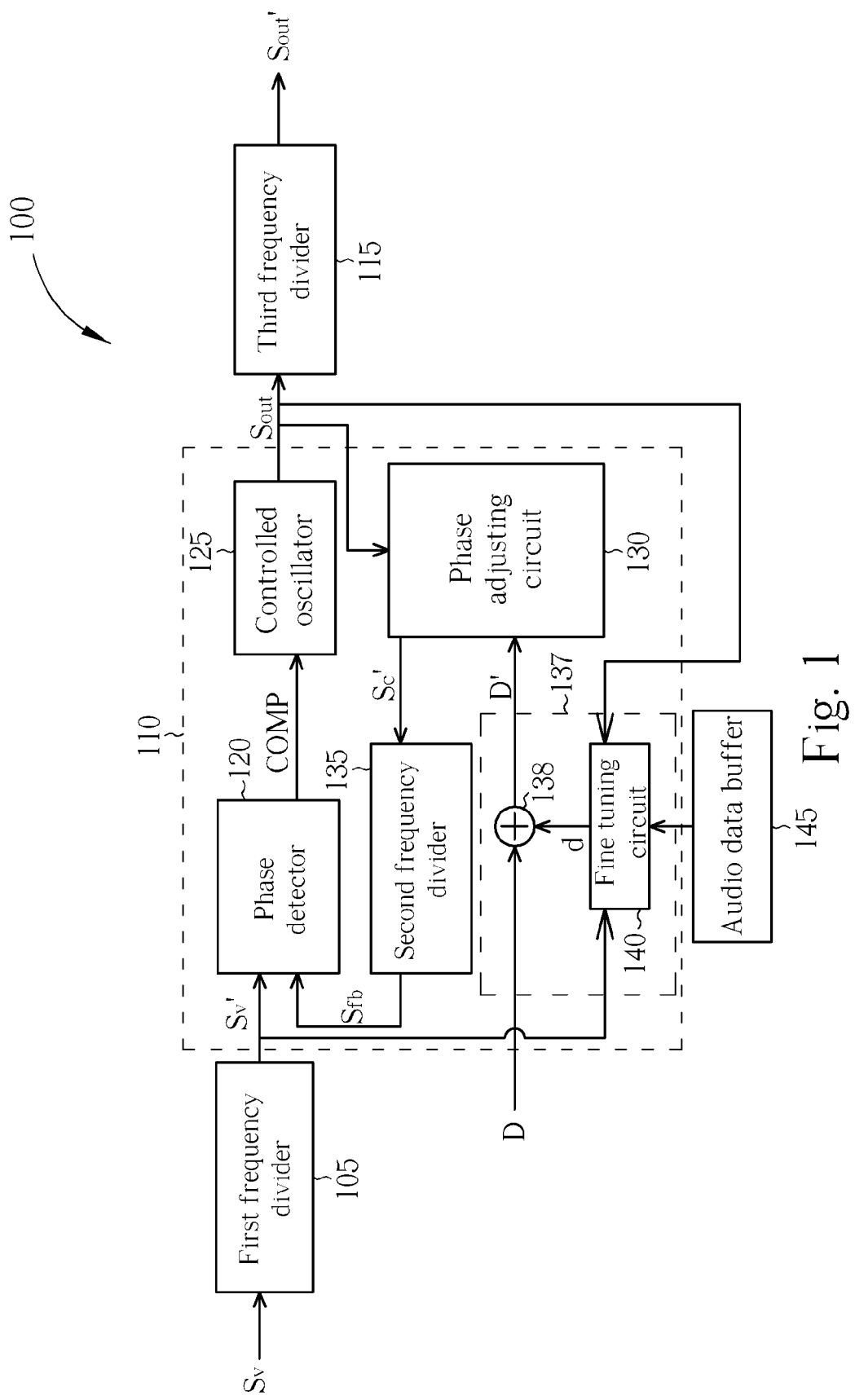
FIG. 1 is a diagram of an apparatus according to an embodiment of the present invention.

Please refer to FIG. 1. FIG. 1 is a diagram of an apparatus 100 for generating an audio output clock $S_{out}'$ according to an embodiment of the present invention. As shown in FIG. 1, the apparatus 100 comprises a first frequency divider 105, a frequency synthesizer (ex: phase-locked loop or delayed-locked loop) 110, a third frequency divider 115, and an audio data buffer 145. The frequency synthesizer 110 comprises a phase detector 120, a controlled oscillator 125, a phase adjusting circuit 130, a second frequency divider 135, and an adjusting control circuit 137. The adjusting control circuit 137 comprises an adder 138 and a fine tuning circuit 140. The first frequency divider 105 receives a video clock signal $S_v$ of a multimedia signal from a multimedia interface and divides the video clock signal $S_v$ by a frequency-division factor K to output a clock signal $S_v'$ having a frequency $f_v/K$. The phase detector 120 detects a phase difference between the clock signal $S_v'$ and a feedback signal $S_{fb}$, and generates a detection result COMP according to the phase difference. The controlled oscillator 125 (e.g. a voltage-controlled-oscillator (VCO), or a voltage-controlled-delay-line (VCDL)) generates a clock signal $S_{out}$ having a frequency $f_{out}$ according to the detection result COMP. The third frequency divider 115 divides the clock signal $S_{out}$ by a frequency-division factor SF to output the audio output clock $S_{out}'$ having a frequency $f_{out}/SF$, where the audio output clock $S_{out}'$ corresponds to an audio clock signal of the multimedia signal. The phase adjusting circuit 130 adjusts a phase of the received clock signal $S_{out}$ to output an adjusted clock signal $S_c'$ according to a phase adjustment. The second frequency divider 135 divides the adjusted clock signal $S_c'$ by a frequency-division factor M to generate the feedback signal $S_{fb}$. The frequency-division factors K, M, and SF mentioned above are frequency-division factors in different frequency dividers respectively and satisfy the following equation:

$$\frac{M}{K \times SF} = \frac{N}{CTS} \quad \text{Equation (2)}$$

Based on Equation (2), the frequency-division operations are accomplished by three frequency dividers instead of only two original frequency dividers (N and CTS are parameters contained in an information frame of the multimedia signal and also corresponding frequency-division factors of the two frequency dividers respectively). However, the frequency-division operations accomplished based on Equation (2) can prevent the apparatus 100 from noise interference resulting from the fact that original frequency dividers require higher accuracy for frequency-division factors N and CTS. It should be noted that the audio output clock $S_{out}'$ having the frequency $f_{out}/SF$ is still required to be processed by a frequency-division operation (based on the current specification, the corresponding frequency-division factor is 128) to derive the audio clock signal having the frequency $f_a$. The above frequency-division operation with the frequency-division factor 128, however, can also be integrated into the third frequency divider 115 directly. Certainly, this is not a limitation of the present invention.

The apparatus 100, accomplished by the frequency-division operations with frequency-division factors M, K, and SF having limited bit numbers, may not be able to derive the required audio clock signal accurately. Hence, in a preferred embodiment of the present invention, the apparatus 100 further utilizes the phase adjusting circuit 130 and the adjusting control circuit 137 to adjust the generated audio output clock $S_{out}'$ accurately by different phase adjustments. In this embodiment, the phase adjusting circuit 130 adjusts the phase of the received clock signal $S_{out}$ according to a phase adjustment D'. The adjusting control circuit 137 controls a predetermined phase adjustment D to output the above-mentioned phase adjustment D'. The fine tuning circuit 140 is utilized for detecting a phase difference between the clock signals $S_v'$, $S_{out}$ or is utilized for generating a fine adjustment d according to a data amount of the audio data buffer 145. In another embodiment, a possible way of adjusting the phase of the clock signal $S_{out}$ can also be the following: the controlled oscillator 125 outputs a plurality of candidate oscillating signals and the phase adjusting circuit 130 selects one of the candidate oscillating signals to output the adjusted clock signal $S_c'$ according to the phase adjustment D'. For example, phase differences between P candidate oscillating signals can be defined as a fixed value $T_{out}/P$, wherein $T_{out}$ is a period of the clock signal $S_{out}$. A non-fixed phase difference, however, is also suitable for the present invention. In the above-mentioned example, the phase adjustments D', D, and the fine adjustment d are all selection parameters utilized for determining a sum of the phase differences. In an embodiment, the phase adjustment D can be ignored (D=zero). The phase adjustment D', being a sum of the fine adjustment d and the phase adjustment D, can also be a non-integer value. In addition, in other embodiments, the phase adjustment D is a phase adjusting density. For example, two phase unit values are shifted in each period when the phase adjustment D is equal to 2, or one phase unit value is shifted in every two periods when the phase adjustment D is equal to ½. The value of the phase adjusting density D is related to the video clock signal $S_v$, the parameter CTS, the output clock $S_{out}'$, and the parameter N. Certainly, the predetermined phase adjusting density D is also used to reduce the tracking time of the frequency synthesizer 110.

In the above-mentioned embodiments, the phase adjustment (or the selection parameter) D' and the audio output clock $S_{out}'$ can be represented by the following equation:

$$S_{out}' = S_v \times \frac{M}{K \times SF} \times \left(1 + \frac{D'}{P}\right) \qquad \text{Equation (3)}$$

In order to avoid an over large phase difference between the output signal corresponding to the audio output clock $S_{out}'$ generated from the apparatus 100 and the original input signal, and in order to prevent audio data from buffer overflow or buffer underflow, in a preferred embodiment, determining the fine adjustment d requires referencing at least the above-mentioned phase difference and the data amount of the audio data buffer 145. Please refer to FIG. 2. FIG. 2 is a flowchart illustrating operation of the fine tuning circuit 140 for determining the fine adjustment according to an embodiment of the present invention. Some possible ways of determining the fine adjustment d are illustrated in FIG. 2.

For referencing the above-mentioned phase difference to determine the fine adjustment, in Step 200, the fine tuning circuit 140 compares the clock signals $S_v'$ and $S_{out}$ to generate a phase error value and utilizes the phase error value to output a fine adjustment d'. For example, if the phase error value becomes larger, the fine adjustment d' will be increased by the fine tuning circuit 140; otherwise, if the phase error value becomes smaller, the fine adjustment d' will be decreased by the fine tuning circuit 140. Please note that the above-mentioned operation will not be executed until the apparatus 100 has been operated in a period. That is to say, after the frequency of the video clock signal $S_v$ and the frequency of the generated audio output clock $S_{out}'$ are stabilized in that period, the fine tuning circuit 140 starts to compare the clock signals $S_v'$, $S_{out}$. The reason is that the frequency of the video clock signal $S_v$ and the frequency of the generated audio output clock $S_{out}'$ are not stable when the apparatus 100 is just started.

For referencing the data amount of the audio data buffer 145 to determine the fine adjustment, it is required to consider a current change of the audio data amount, a trend of an extreme value (i.e. a maximum value or a minimum value) of the audio data amount, and the relation between the audio data amount and threshold values of the audio data buffer. More specifically, the adjusting control circuit 137 monitors a data amount of the audio data buffer 145 which temporarily stores an audio data amount of the multimedia signal and generates the phase adjustment according to the data amount of the audio data buffer 145. In Step 205, the fine tuning circuit 140 in the adjusting control circuit 137 outputs a fine adjustment $d_1$ to decrease the phase adjustment (or the selection parameter) D' inputted into the phase adjusting circuit 130 finally when the data amount of the audio data buffer 145 decreases continuously a plurality of times (e.g. two times). Otherwise, the fine tuning circuit 140 outputs the fine adjustment $d_1$ to increase the phase adjustment (or the selection parameter) D' inputted into the phase adjusting circuit 130 finally when the data amount of the audio data buffer 145 increases continuously a plurality of times (e.g. two times). Additionally, in Step 210, the fine tuning circuit 140 outputs a fine adjustment $d_2$ to decrease the phase adjustment (or the selection parameter) D' inputted into the phase adjusting circuit 130 finally when the extreme value of the audio data amount gradually approximates to a specific value below the extreme value (i.e. the data amount of the audio data buffer 145 reaches a threshold). Otherwise, the fine tuning circuit 140 outputs the fine adjustment $d_2$ to increase the phase adjustment (or the selection parameter) D' inputted into the phase adjusting circuit 130 finally when the extreme value of the audio data amount gradually approximates to another specific value above the extreme value (i.e. the data amount of the audio data buffer 145 reaches another threshold). It should be noted that, in order to decide the change in the trend of the extreme value of the audio data amount again and again, the fine tuning circuit 140 has to set a recent record value of the extreme value to become zero after outputting the fine adjustment $d_2$ corresponding to the recent record value. In Step 215, the fine tuning circuit 140 outputs a fine adjustment $d_3$ to decrease the phase adjustment (also called the selection factor) D' when the data amount of the audio data buffer 145 is less than a first threshold value, and the fine tuning circuit 140 outputs the fine adjustment $d_3$ to increase the phase adjustment (also called the selection factor) D' when the data amount of the audio data buffer 145 is more than a second threshold value. In this embodiment, for referencing the data amount of the audio data buffer 145 to determine the fine adjustment, a sum of fine adjustments $d_1$, $d_2$, and $d_3$ mentioned above is directly adopted as the fine adjustment. In another embodiment, it is also suitable for fine adjustments $d_1$, $d_2$, and $d_3$ having different weightings respectively. In addition, the fine adjustments $d_1$, $d_2$, and $d_3$ are not all adopted simultaneously, and designers can adopt required fine adjustments according to different requirements. In Step 220, the fine tuning circuit 140 sums the fine adjustments d', $d_1$, $d_2$, and $d_3$ to determine the fine adjustment d.

Please note that, in the present invention, the problem caused by the prior art can also be solved by the above-mentioned phase adjustment determined by only using the phase adjusting circuit 130 without the fine tuning circuit 140. Furthermore, in other embodiments, only three frequency dividers having different frequency-division factors K, M, and SF are also able to generate an audio output clock $S_{out}'$. Utilizing only three frequency dividers is helpful in circuit design for avoiding difficulty introduced by directly utilizing extreme values of the frequency-division factors N and CTS to derive the frequency of the audio output clock $S_{out}'$. Of course, the spirit of the present invention can also apply to recover any output clock not limited to the above-mentioned audio output clock.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for generating an audio output clock, comprising:
   a first divider, for receiving a video clock signal of a multimedia signal from a multimedia interface and dividing the video clock signal according to a first frequency-division factor K to output a first clock signal;
   a frequency synthesizer, coupled to the first divider, comprising:
      a phase detector, for detecting a phase difference between the first clock signal and a feedback signal and generating a detection result according to the phase difference;
      a controlled oscillator, for generating a second clock signal according to the detection result; and
      a second divider, for dividing the second clock signal according to a second frequency-division factor M to output the feedback signal; and
   a third divider, coupled to the frequency synthesizer, for dividing the second clock signal according to a third frequency-division factor SF to output the audio output clock, wherein the audio output clock corresponds to an audio clock signal of the multimedia signal.

2. The apparatus of claim 1, wherein the first frequency-division factor K, the second frequency-division factor M, and the third frequency-division factor SF satisfy an equation as below:

$$N/CTS = M/(K \times SF);$$

wherein CTS and N are parameters contained in an information frame of the multimedia signal.

3. The apparatus of claim 1, further comprises:
   a phase adjusting circuit, coupled between the controlled oscillator and the second divider, for adjusting a phase of the second clock signal according to a phase adjustment; and
   an adjusting control circuit for outputting the phase adjustment.

4. The apparatus of claim 3, wherein the adjusting control circuit comprises:
   a fine tuning circuit, for detecting a phase difference between the first clock signal and the second clock signal to generate a first adjustment;
   wherein the adjusting control circuit generates the phase adjustment according to the first adjustment.

5. The apparatus of claim 3, wherein the adjusting control circuit generates the phase adjustment according to a data amount of an audio data buffer.

6. The apparatus of claim 3, wherein the phase adjustment is a non-integer value.

7. The apparatus of claim 3, wherein the adjusting control circuit adjusts the phase adjustment when a data amount of an audio data buffer reaches a threshold.

8. A method for generating an output clock, comprising:
   dividing a video clock signal of a multimedia signal from a multimedia interface according to a first frequency-division factor K to output a first clock signal;
   detecting a phase difference between the first clock signal and a feedback signal to generate a detection result;
   generating a second clock signal according to the detection result;
   dividing the second clock signal according to a second frequency-division factor M to output the feedback signal; and
   dividing the second clock signal according to a third frequency-division factor SF to generate the audio output signal;
   wherein the output clock corresponds to an audio clock signal of the multimedia signal.

9. The method of claim 8, wherein the first frequency-division factor K, the second frequency-division factor M, and the third frequency-division factor SF satisfy an equation as below:

$$N/CTS = M/(K \times SF);$$

wherein CTS and N are parameters contained in an information frame of the multimedia signal.

10. The method of claim 8, further comprising:
    adjusting a phase of the second clock signal according to a phase adjustment.

11. The method of claim 10, wherein the phase adjustment is a non-integer.

12. The method of claim 10, further comprising:
    detecting a phase difference between the first clock signal and the second clock signal to generate a first adjustment; and
    generating the phase adjustment according to the first adjustment.

13. The method of claim 10, further comprising:
    generating the phase adjustment according to a data amount of an audio data buffer.

14. The method of claim 10, wherein the phase adjustment is changed when a data amount of an audio data buffer is continuously changed.

15. The method of claim 10, wherein further comprises:
    generating the phase adjustment according to an extreme value of a data amount of an audio data buffer.

16. The method of claim 10, wherein the phase adjustment is adjusted when a data amount of an audio data buffer reaches a threshold.

17. An apparatus for generating an output clock, comprising:
    a phase detector for detecting a phase difference between a first clock signal and a feedback signal and generating a detection result according to the phase difference;

a controlled oscillator for generating the output clock according to the detection result;

a phase adjusting circuit for adjusting a phase of the output clock according to a phase adjustment to generate a phase-adjusted clock;

a feedback divider for dividing the phase-adjusted clock according to a division factor to output the feedback signal;

a buffer for temporarily storing audio data of a multimedia signal; and an adjusting control circuit for monitoring a data amount of the buffer, and generating the phase adjustment according to the data amount of the buffer; wherein the first clock signal corresponds to a video clock signal of a multimedia signal from a multimedia interface.

18. The apparatus of claim 17, wherein the phase adjustment is a non-integer.

19. A method for generating an output clock, comprising:

detecting a phase difference between a first clock signal and a feedback signal and generating a detection result according to the phase difference;

generating the output clock according to the detection result;

adjusting a phase of the output clock according to a phase adjustment to generate a phase-adjusted clock, wherein the feedback signal is corresponding to the phase-adjusted clock; and monitoring a data amount of a buffer and generating the phase adjustment according to the data amount of the buffer; wherein the first clock signal corresponds to a video clock signal of a multimedia signal from a multimedia interface, and the buffer is used for temporarily storing audio data of the multimedia signal.

* * * * *